Figure 1:
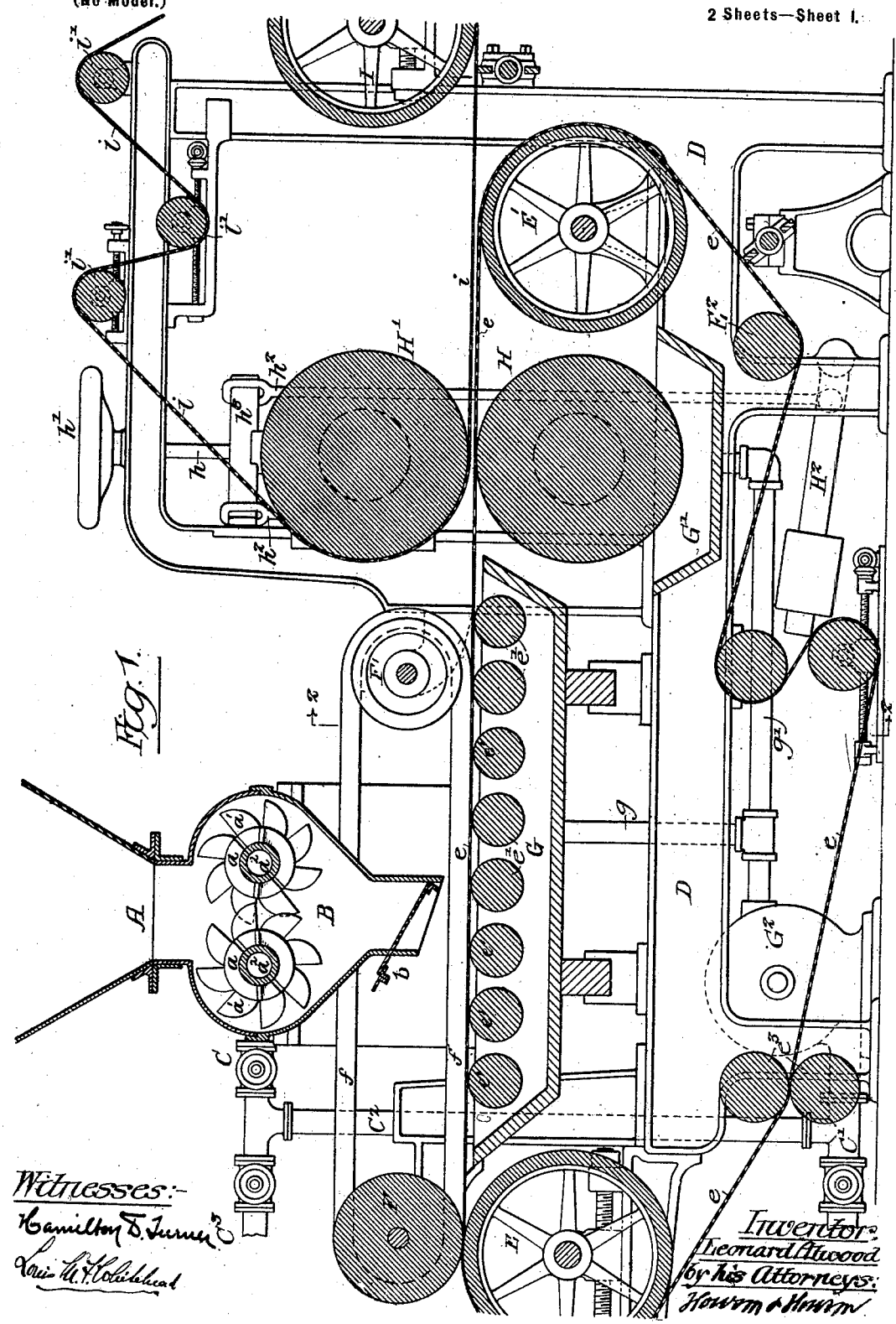

No. 696,883. Patented Apr. 1, 1902.
L. ATWOOD.
MACHINE FOR EXTRACTING LIQUID FROM BREWERS' GRAINS, &c.
(Application filed Dec. 6, 1900.)
(No Model.) 2 Sheets—Sheet 1.

Witnesses:—
Inventor
Leonard Atwood
by his Attorneys

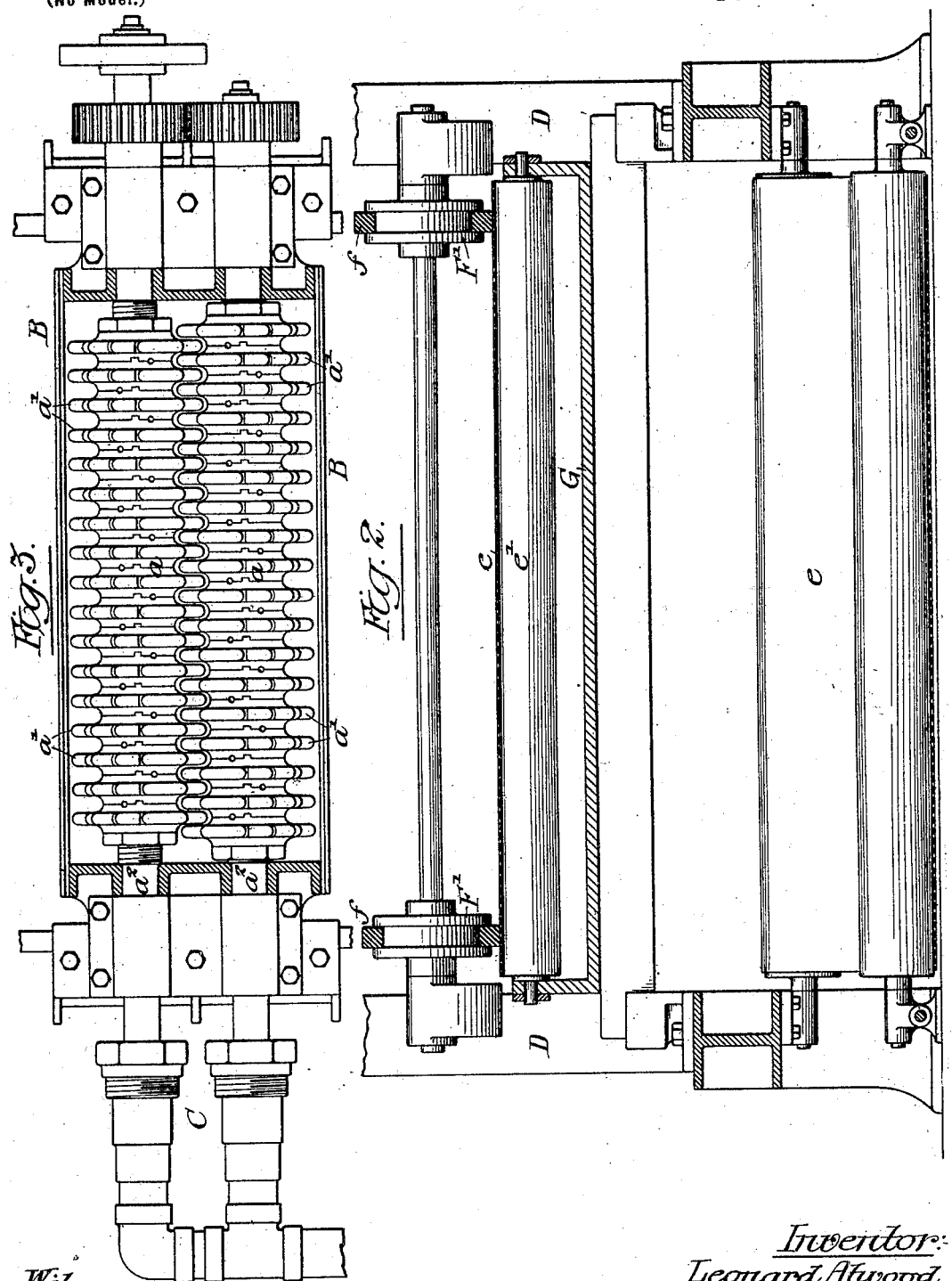

UNITED STATES PATENT OFFICE.

LEONARD ATWOOD, OF PHILADELPHIA, PENNSYLVANIA.

MACHINE FOR EXTRACTING LIQUID FROM BREWERS' GRAINS, &c.

SPECIFICATION forming part of Letters Patent No. 696,883, dated April 1, 1902.

Application filed December 6, 1900. Serial No. 38,906. (No model.)

*To all whom it may concern:*

Be it known that I, LEONARD ATWOOD, a citizen of the United States, residing in Philadelphia, Pennsylvania, have invented certain Improvements in Machines for Extracting Liquid from Brewers' Grains, &c., of which the following is a specification.

My invention relates to apparatus for treating brewers' grains or other granular or powdered materials before they are dried by heat.

For convenience I will in this specification refer to the material under treatment as "brewers' grains."

The object of my invention is to so construct and operate the machine that the mass of grains when delivered therefrom will be uniformly moist or damp throughout, whereby the subsequent application of heat to the mass will effect the uniform drying of the same, there being no risk, on the one hand, of insufficient drying of the grains, or, on the other hand, of overdrying or burning, as there must necessarily be if the percentage of moisture is not uniform throughout the mass of grains when the same is subjected to the heat.

Machines constructed prior to my invention waste a large percentage of the valuable gluten contents of the grains; and it is one of the objects of my invention to prevent such waste.

The process as carried out in my improved machine is to first mix the grains with liquid until the mass is sufficiently fluid to readily flow onto and spread to a uniform level over a porous belt. While upon this belt a large amount of the liquid passes from the mass of grains by natural drainage through the belt, and the mass is then passed between squeeze-rolls, whereby the greater portion of the remaining liquid is expressed, the mass as finally delivered, being in a damp or moist state, with an even percentage of moisture throughout all of its parts. Water may be used in the first instance for admixture with the grains; but after the machine is started it is preferable to employ for this purpose the liquid drained or expressed from the mass, because of its valuable gluten contents.

In the accompanying drawings, Figure 1 is a longitudinal sectional view of the machine. Fig. 2 is a transverse section on the line 2 2, Fig. 1; and Fig. 3 is a plan view, partly in section, of the feeding mechanism of the machine.

A is the feed-hopper in which the grains are deposited, and B is a box or casing located below the hopper and containing the feed-rolls $a\ a$, each of which has projecting teeth $a'$ of the shape shown, these teeth being longitudinally separated and the teeth of one roll entering the spaces between the teeth of the other roll, so as to feed the material from the hopper onto the traveling belt or apron $e$ beneath the box B. By this method I obtain an even feed of the material and break up any lumps that may have formed in the hopper A.

The shafts $a^2$ of the rolls $a$ are hollow, are perforated, and are coupled to a liquid-supply pipe C, so that the liquid can flow from the tubular shafts and mix with the grains as they are fed from the hopper. Hence there is not only a uniform feed from the hopper, but sufficient liquid is added to the mass of grains to cause them to flow onto the porous belt or apron and distribute evenly over the surface thereof. The flow of material from the box or casing B is controlled by a valve $b$, which may be of any type desired.

D is the frame of the machine, and carried by bearings on this frame are the two breast-rolls E E', around which passes the porous belt $e$, which may be made of any material desired, being sufficiently porous to allow a certain percentage of the free liquid to pass through it and into a drip-catching box G.

A series of carrying-rolls $e'$ for the belt $e$ are mounted in the present instance in the sides of the drip-catcher G, although they may be mounted in an independent frame, if desired.

Deckle-straps $f f$ pass around deckle-wheels F F', mounted in suitable bearings in the frame of the machine. The deckle-wheel F is solid throughout the full width of the machine and is mounted directly above the breast-roll E, so that while the deckle-straps prevent the grains from passing over the sides of the belt $e$ the wheel F prevents the grains escaping at the back of the machine.

H H' are the squeeze-rolls, and the belt $e$, carrying the grains, passes between these rolls, the lower squeeze-roll H being mounted in fixed bearings in the frame of the machine, while the upper squeeze-roll is mounted in bearings which are adjustable on the frame and may be controlled by a screw-shaft $h$, having a hand-wheel $h'$, as shown.

Weighted levers $H^2$ are connected by rods $h^2$ to a cross-bar $h^3$ above the box of the adjustable roll $H'$, so that the weight upon the roll can be regulated.

The porous belt $e$ in its return passes around guide-rolls $E^2$ and between squeeze-rolls $e^3$, which are so adjusted that more or less pressure may be exerted to squeeze the belt before it receives another charge of grains.

Directly under the press-roll H is a trough $G'$ to catch the liquid as it is squeezed from the grain by the rolls H H', the troughs G and G' being connected by pipes $g$ $g'$ to a pump $G^2$, which in turn is connected to the pipe C through the pipes $C'$ $C^2$. The pipe $C'$ is also connected to a waste-pipe, and the pipe C is connected to a water-supply pipe $C^3$, suitable valves being provided for cutting off any of the pipes, as desired. By this construction the liquid that escapes from the grain is collected by the pump and forced into the tubular shafts $a^2$ of the rolls and is mixed with the grain, so that the grain will be delivered to the belt in such condition that it will readily flow over the same.

A porous belt $i$ passes around the upper squeeze-roll $H'$, around a roll I, mounted in suitable bearings in the frame of the machine, and around tension-rolls $i'$. This belt travels for a certain distance parallel with the belt $e$ and is continued beyond the breast-wheel E', as shown, so that the grain after it passes between the squeeze-rolls is carried forward by the two belts and finally discharged over the end of the breast-roll E'.

Suitable means may be provided for agitating the belts to remove any grain that would tend to adhere thereto, and these belts may be cleansed by sprays of water or other liquid, as desired.

I claim as my invention—

1. The combination in a machine for extracting liquid from brewers' grains, &c., of a hopper for the grain, means for feeding the grains in an even stream from the hopper, a porous endless carrying-belt upon which the grains are discharged, mechanism connected to the hopper constructed to mix liquid with the grains previous to their discharge upon said belt, so as to cause them to flow over the belt, and means for extracting liquid from the grains while on the belt, substantially as described.

2. The combination in a machine for extracting liquid from brewers' grains, &c., of an endless carrying-belt for the grains through which the liquid can escape, a pair of squeeze-rolls between which the belt is traversed, means for driving the squeeze-rolls and belt, a hopper mounted above the belt in front of the squeeze-rolls, mechanism connected to the hopper constructed to feed the grains from the hopper to the belt at a uniform speed, and to simultaneously add liquid to the grains so that they will flow evenly over the surface of the belt, substantially as described.

3. The combination in a machine for extracting liquid from brewers' grains, &c., of an endless belt, squeeze-rolls between which the belt passes, a hopper mounted above the belt, a feeding device connected to the hopper for delivering the grains in uniform quantity to the belt, and means for mixing liquid with the grains as they are fed to the belt so that they will be spread evenly over the face of the belt, substantially as described.

4. The combination in a machine for extracting liquid from brewers' grains, &c., of a porous belt, squeeze-rolls between which the belt passes, a hopper mounted above the belt, means for feeding the grains from the hopper onto the belt, and means for collecting the liquid extracted from the grains on the belt and at the squeeze-rolls, and mechanism connected to the hopper constructed to mix said liquid with the grains and to simultaneously deliver them therefrom so that the extracted liquid is used for the purpose of floating the grain upon the surface of the belt, substantially as described.

5. The combination in a machine for extracting liquid from brewers' grains, &c., of an endless porous belt, squeeze-rolls between which the belt passes, a hopper mounted above the belt in advance of the squeeze-rolls, a feeding device directly under the hopper consisting of two toothed rolls, the teeth of each roll being suitably spaced, and the teeth of one roll entering the spaces between the teeth of the other roll, said rolls being hollow and perforated, and a liquid-supply pipe connected to said rolls, so that the grains, as they are fed from the hopper, are mixed with sufficient liquid to cause them to be distributed in an even mass over the surface of the belt, substantially as described.

6. The combination in a machine for extracting liquid from brewers' grains, &c., of a hopper, an endless porous belt, breast-rolls around which the said belt passes, squeeze-rolls between which the belt passes, a second belt overlapping the first-mentioned belt and passing around the upper squeeze-roll and around a guide-roll, supporting-rolls for the belt where it receives the grains, collectors under the supporting-roll and under the squeeze-roll, a pump connected to the collectors, and a pipe leading from the pump to the hopper, substantially as described.

In testimony whereof I have signed my name to this specification in the presence of two subscribing witnesses.

LEONARD ATWOOD.

Witnesses:
WILL. A. BARR,
JOS. H. KLEIN.